United States Patent [19]

Matzek

[11] 3,844,853
[45] Oct. 29, 1974

[54] NON-SOLVATED ALUMINUM HYDRIDE COATED WITH STABILIZER

[75] Inventor: Norman E. Matzek, Midland, Mich.

[73] Assignee: The Dow Chemical Company, Midland, Mich.

[22] Filed: July 28, 1965

[21] Appl. No.: 476,780

Related U.S. Application Data

[63] Continuation-in-part of Ser. No. 290,880, June 21, 1963, abandoned.

[52] U.S. Cl............................ 149/5, 423/645, 149/7, 149/8
[51] Int. Cl............................................ C06b 19/02
[58] Field of Search........... 149/5, 7, 8; 23/204, 365

[56] References Cited
FOREIGN PATENTS OR APPLICATIONS
860,377   2/1961   Great Britain OTHER PUBLICATIONS
Hoffman, LMSD703150, Aluminum Hydride, A literature Review, Lockheed Aircraft Corp., Sunnyvale, Calif., Aug. 1960, pp. 15, 16 and 19.

*Primary Examiner*—Leland A. Sebastian
*Attorney, Agent, or Firm*—C. Kenneth Bjork

[57] ABSTRACT

A novel surface treatment for improving the storageability and thermal stability of non-solvated particulate aluminum hydride. The invention comprises sorbing onto the surface of the aluminum hydride a small amount of a gaseous or liquid stabilizing agent selected from the group consisting of nitrogen oxide, $N_2F_4$, oxygen, carbon dioxide, volatile inorganic chlorides, volatile inorganic sulfides, triethylene glycol dinitrate and carbon tetrachloride thereby to provide a surface coating of the stabilizing agent on the surface of the aluminum hydride.

2 Claims, No Drawings

NON-SOLVATED ALUMINUM HYDRIDE COATED WITH STABILIZER

This application is a continuation-in-part of U.S. Pat. application Ser. No. 290,880, filed June 21, 1963, now abandoned.

This invention relates to the thermal stabilization of aluminum hydride and more particularly is concerned with a surface treatment for substantially non-solvated particulate aluminum hydride which provides for improved storageability and thermal stability of the hydride at elevated temperatures.

Novel crystal forms of non-solvated aluminum hydride as disclosed in copending applications Ser. No. 179,509, filed Mar. 8, 1962 and Ser. No. 234,277, filed Oct. 23, 1962 have been found to be particularly suitable for use as fuels in rocket propellant formulations.

However, these and other forms of aluminum hydride by nature are thermodynamically unstable at moderately elevated temperatures e.g. 50°–120° and higher, and undergo spontaneous detrimental decomposition when subject to such elevated temperatures.

Since rockets and missiles many times must be stored for extended periods of time under a variety of climatic conditions, it is very desirable that the autodecomposition of aluminum hydride be reduced to a minimum and its stable life at both high and low atmospheric temperatures be prolonged to assure functioning of a propellant grain containing this fuel or sensitizer component at the required time.

It is a principal object of the present invention to provide a treatment for substantially non-solvated forms of aluminum hydride whereby the resistance of the material to degradation at elevated temperatures is markedly increased.

It is another object of the present invention to provide a surface coating treatment for aluminum hydride which increases the resistance of the aluminum hydride to thermal degradation and also aids in promoting the compatibility of the material with other components of propellant formulations.

It is a further object of the present invention to provide a surface treatment for aluminum hydride which does not detrimentally degrade the material with respect to its chemical reactivity.

It is also an object of the present invention to provide a surface treatment for aluminum hydride which imparts thermal stability to the aluminum hydride at elevated temperature even after prolonged storage.

These and other objects and advantages readily will become apparent from the detailed description presented hereinafter.

In accordance with the present invention, the thermal stability of aluminum hydride is markedly increased by providing a surface treatment for the particulate aluminum hydride material. More particularly the aluminum hydride is stabilized by sorbing a small amount of a stabilizing agent thereon.

Ordinarily a small amount, from as little as a few hundredths of a per cent to about 1 per cent on the weight of the aluminum hydride of a gaseous or liquid stabilizing agent is chemabsorbed or otherwise absorbed, adsorbed or introduced onto the surface of the aluminum hydride. The actual amount to be employed with a particular aluminum hydride product is determined by the surface area of the particulate hydride and the size of the molecule of the stabilizing agent.

The stabilizing agent to be employed can be any of a variety of materials which do not detrimentally attack the aluminum hydride, impart thermal degradation resistance to the hydride and which are readily sorbed onto the hydride surface. If the so-stabilized aluminum hydride is to be employed in a propellant formulation the surface stabilizer is further characterized in that it does not react detrimentally with the formulation components of the propellant.

Volatile materials which are gases at atmospheric pressure and temperature such as oxygen, carbon dioxide, nitrogen oxide (NO), $N_2F_4$, boron trifluoride, etc. as well as other volatile organic and inorganic compounds, e.g. tin tetrafluoride, silicon tetrachloride, iron trichloride, carbon tetrachloride, aluminum trichloride, aluminum sulfide, mercuric chloride, fluorohalocarbons and the like are suitable for use in the present treatment.

Materials having unpaired electrons, e.g. NO and $N_2F_4$, appear to be particularly effective as stabilizing agents. Also, volatile, strong Lewis acid Friedel-Crafts type catalysts, e.g. $AlCl_3$ and $BF_3$, have been found to be very satisfactory.

Stabilizing agents which are gaseous or exhibit a high volatility at application conditions, i.e., normally room temperature (about 18° to about 25° C.) and atmospheric pressure can be applied by passing a stream of the gas over or through a mass of the particulate aluminum hydride. Alternatively, the aluminum hydride can be maintained or stored for an extended period of time in the presence of an atmosphere of the gaseous stabilizing agent.

Liquid stabilizing agents which are not readily volatilizable or solid stabilizing agents advantageously can be dissolved in an inert solvent and the aluminum hydride be treated with the solution as by immersion or washing to provide the surface treatment.

In certain instances, the aluminum hydride can be treated directly with a liquid stabilizing agent. For example, aluminum hydride which has been stored under triethylene glycol dinitrate exhibits good stabilization.

An advantage of the present process is that the small amount of stabilizing agent sorbed to the aluminum hydride provides no detrimental degradation or dilution of the hydride product while markedly improving its storage characteristics.

The following Examples will serve to illustrate further the present invention but are not meant to limit it thereto.

EXAMPLE 1

A sample of non-solvated α-aluminum hydride was placed in a container, the container and contents were evacuated to a low pressure of about $1 \times 10^{-5}$ mm Hg after which a gaseous stabilizing agent was introduced into the container and contacted the aluminum hydride for about 16 hours. The stabilizing agent was then removed and the aluminum hydride heated to a temperature of about 100° C. and maintained at this temperature for a period of time.

As a control a sample of the same α-aluminum hydride which had not been given the surface treatment was similarly tested. Table I shows the amount of decomposition of aluminum hydride samples treated with oxygen, nitrogen oxide (NO), $N_2F_4$ and carbon dioxide as well as a control.

Table I

| Run No. | Sample $AlH_3$ | % Decomposition, 4 hrs. | % Decomposition, 7 hrs. |
|---|---|---|---|
| 1 | Control - No surface treatment | 0.60 | 5.63 |
| 2 | Surface coated with $O_2$ | 0.21 | 0.72 |
| 3 | Surface coated with NO | 0.10 | 0.21 |
| 4 | Surface coated with $CO_2$ | 0.60 | 2.65 |
| 5 | Surface coated with $N_2F_4$ | 0.60 | 1.10 |

EXAMPLE 2

A sample of γ-aluminum hydride (about 4 grams) was agitated for about 20 minutes in a diethyl ether solution containing about 0.1 weight per cent of $AlCl_3$. After this time, the aluminum hydride was filtered from the ethereal solution, the treated product washed with ether to remove any excess aluminum chloride not sorbed onto the aluminum hydride and the so-treated product dried under reduced pressure.

This material which ordinarily has a distinct tendency to convert to α-aluminum hydride with simultaneous decomposition to hydrogen and aluminum was allowed to age at room temperature for an extended period of time. An untreated sample was similarly aged. Table II shows the results of the aging tests on the two different samples. The percentages of the various phases were determined by X-ray analysis.

Table II

| Aging Period Days | γ-$AlH_3$ % | α-$AlH_3$ % | Al % |
|---|---|---|---|
| $AlCl_3$ Coated γ-$AlH_3$ | | | |
| 0 | 100 | 0 | 0 |
| 25 | 89 | 10 | 0 |
| 50 | 82 | 16 | 2 |
| 75 | 77 | 20 | 3 |
| 100 | 73 | 24 | 3 |
| Uncoated γ-$AlH_3$ Control | | | |
| 0 | 100 | 0 | 0 |
| 25 | 50 | 25 | 25 |
| 50 | 12 | 54 | 34 |
| 75 | 4 | 61 | 35 |
| 100 | 0 | 63 | 37 |

EXAMPLE 3

A sample of α-aluminum hydride was treated with a diethyl ether solution of aluminum sulfide by following the procedure described for Example 2. The resulting product was then stored for an extended period of time at room temperature after which it was subjected to a temperature of about 60° C. and held at this temperature for a number of hours.

Untreated samples of this same aluminum hydride product were similarly tested after the same storage period under the same storage conditions. The results of these studies are presented in Table III.

Table III

| Run No. | Sample | Storage Period (days) | Percent decomposition of $AlH_3$ Time held at 60° C. | | | |
|---|---|---|---|---|---|---|
| | | | 2 hrs. | 6 hrs. | 12 hrs. | 22 hrs. |
| 1 | $AlH_3$ uncoated (control) | 63 | 0.05 | 0.1 | 0.23 | 0.44 |
| 2 | $AlH_3$ coated | 63 | 0.02 | 0.04 | 0.08 | 0.15 |
| 3 | $AlH_3$ uncoated (control) | 78 | 0.25 | >1* | — | — |
| 4 | $AlH_3$ coated | 78 | 0.02 | 0.07 | 0.10 | 0.18 |
| 5 | $AlH_3$ uncoated (control) | 114 | (Sample decomposition was extremely rapid and of large magnitude) | | | |
| 6 | $AlH_3$ coated | 114 | 0** | 0.02 | 0.05 | 0.13 |

\* Rapid decomposition becoming pronounced at 6 hours.
\*\* Too slight to measure

EXAMPLE 4

A substantially non-solvated α-aluminum hydride was stored at room temperature under triethylene glycol dinitrate.

A second sample of the same α-aluminum hydride material was similarly stored under a nitrogen atmosphere as is ordinarily employed for aluminum hydride storage. Both the triethylene glycol dinitrate coated and the nitrogen treated materials were subsequently subjected to a temperature of about 60° C. for an extended period of time.

Table IV shows the differences in amount of decomposition of the triethylene glycol dinitrate treated and the untreated sample.

Table IV

| Time on Test at 60° C. (days) | Total Decomposition - % | |
|---|---|---|
| | Untreated α-$AlH_3$ | Triethylene Glycol Dinitrate coated α-$AlH_3$ |
| 1 | 0.05 | 0.05 |
| 2 | 0.06 | 0.05 |
| 3 | 0.12 | 0.05 |
| 4 | 0.23 | 0.05 |
| 5 | 0.37 | 0.08 |
| 6 | 0.56 | 0.12 |
| 7 | 0.88 | 0.18 |
| 8 | 1.30* | 0.28 |

\* Rapid decomposition becoming pronounced

This study shows particularly the effectiveness of the present surface treatment not only for decreasing the rate of decomposition of aluminum hydride but also indicated the effectiveness of this coating for markedly increasing the induction period before substantially any decomposition is observed.

EXAMPLE 5

A number of propellant formulations were prepared by blending α-aluminum hydride with a set amount of ammonium perchlorate and nitrocellulose. Both uncoated and surface-coated aluminum hydrides were used.

The purpose of this test was to determine the compatibility, i.e., storageability of the aluminum hydride with the other mix components.

The formulation was calculated to have a theoretical density of about 1.55 grams per cubic centimeter. The formation of voids or gas pockets in the final grain, which are evidence primarily of hydride decomposition, is reflected as a lower density in the propellant. The density, in turn, therefore is a measure of the quality of the propellant; the lower the density, the poorer quality is the propellant. With the particular formulation tested a density of 1.5 grams per cubic centimeter was marginal for a successful motor firing.

The densities of a number of propellant grains containing the same amounts of the same type aluminum hydride, ammonium perchlorate and triethylene glycol dinitrate wherein the aluminum hydride is coated with various stabilizing agents are presented in Table V.

Table V

| Aluminum Hydride in Grain | Density of Grain - g/cm$^3$ |
|---|---|
| Reference (no coating) | 1.49±0.02 |
| Surface Coated with HgCl$_2$ | 1.56±0.02 |
| Surface Coated with AlCl$_3$ | 1.57±0.02 |
| Surface Coated with Al$_2$S$_3$ | 1.55±0.02 |
| Surface Coated with CCl$_4$ | 1.52±0.02 |
| Surface Coated with NO | 1.52±0.02 |

A number of the coated aluminum hydride products used in the propellant formulation were analyzed for elemental constituents to determine the effect of the coating on the composition of the aluminum hydride to evaluate the amount of coating present. Table VI shows the analysis of the aluminum hydride before coating and after coating.

Table VI

| Element | Original Analysis | HgCl$_2$ Coated % | AlCl$_3$ Coated | CCl$_4$ Coated |
|---|---|---|---|---|
| C | 0.2 | 0.3 | 0.3 | 0.2 |
| H | 10.0 | 9.9 | 9.9 | 9.9 |

Table VI—Continued

| Element | Original Analysis | HgCl$_2$ Coated % | AlCl$_3$ Coated | CCl$_4$ Coated |
|---|---|---|---|---|
| Al | 89.0 | 88.2 | 88.4 | 89.5 |
| Cl | 0.2 | 0.3 | 0.2 | 0.2 |
| Li | 0.3 | 0.3 | 0.3 | 0.3 |

The substantial identity of analytical results, within the limits of experimental error, is a clear indication that the coating does not dilute the aluminum hydride to any appreciable extent and is present in only a very small amount based on the weight of the hydride.

In a manner similar to that described for the foregoing Examples, boron trifluoride, iron trichloride, silicon tetrachloride and the like also can be used as surface coating for aluminum hydride thereby to enhance the stability of the compound against autodecomposition at elevated temperatures.

Various modifications can be made in the present invention without departing from the spirit or scope thereof for it is understood that I limit myself only as defined in the appended claims.

I claim:

1. A substantially non-solvated aluminum hydride having an enhanced thermal stability which comprises;
   a substantially non-solvated aluminum hydride having a surface coating of from about a few hundredths of a per cent to about 1 per cent on the weight of said aluminum hydride of a member selected from the group consisting of nitrogen oxide (NO), N$_2$F$_4$, oxygen, carbon dioxide, volatile inorganic chlorides, volatile inorganic sulfides, triethylene glycol dinitrate and carbon tetrachloride.

2. A surface treating process for increasing the thermal stability of non-solvated aluminum hydride which comprises;
   treating a substantially non-solvated aluminum hydride with a stabilizing agent selected from the group consisting of nitrogen oxide (NO), N$_2$F$_4$, oxygen, carbon dioxide, volatile inorganic chlorides, volatile inorganic sulfides, triethylene glycol dinitrate and carbon tetrachloride, and
   sorbing from about a few hundredths of a per cent to about 1 per cent on the weight of said aluminum hydride of said stabilizing agent onto the surface of said aluminum hydride.

* * * * *